(12) United States Patent
Fleischer et al.

(10) Patent No.: US 10,275,256 B2
(45) Date of Patent: Apr. 30, 2019

(54) BRANCH PREDICTION IN A COMPUTER PROCESSOR

(71) Applicant: International Business Machines Corporation, Armonk, NY (US)

(72) Inventors: Bruce M. Fleischer, Bedford Hills, NY (US); Michael N. Goulet, Austin, TX (US); David S. Levitan, Austin, TX (US); Nicholas R. Orzol, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 249 days.

(21) Appl. No.: 15/049,700

(22) Filed: Feb. 22, 2016

(65) Prior Publication Data

US 2017/0242701 A1    Aug. 24, 2017

(51) Int. Cl.
*G06F 9/38* (2018.01)
*G06F 9/30* (2018.01)

(52) U.S. Cl.
CPC ........ *G06F 9/3848* (2013.01); *G06F 9/30036* (2013.01); *G06F 9/30058* (2013.01); *G06F 9/3802* (2013.01)

(58) Field of Classification Search
CPC ............. G06F 9/30021; G06F 9/30036; G06F 9/3802; G06F 9/30058
See application file for complete search history.

(56) References Cited

U.S. PATENT DOCUMENTS

| 5,148,538 | A  | * | 9/1992 | Celtruda ................. G06F 9/383 711/204 |
| 7,809,933 | B2 |   | 10/2010 | Levitan et al. |
| 2004/0215720 | A1 | * | 10/2004 | Alexander .......... G06F 9/30181 709/204 |
| 2005/0149707 | A1 | * | 7/2005 | Jourdan ................ G06F 9/3848 712/239 |
| 2015/0032997 | A1 | * | 1/2015 | Eickemeyer ........ G06F 9/30058 712/206 |
| 2015/0046690 | A1 |   | 2/2015 | Eickemeyer et al. |

OTHER PUBLICATIONS

Jun Shao and Brian T. Davis. 2005. The bit-reversal SDRAM address mapping. In Proceedings of the 2005 workshop on Software and compilers for embedded systems (SCOPES '05). ACM, New York, NY, USA, 62-71.*

(Continued)

*Primary Examiner* — Aimee Li
*Assistant Examiner* — Kasim Alli
(74) *Attorney, Agent, or Firm* — Nathan M. Rau

(57) ABSTRACT

Branch prediction in a computer processor, includes: fetching an instruction, the instruction comprising an address, the address comprising a first portion of a global history vector and a global history vector pointer; performing a first branch prediction in dependence upon the first portion of the global history vector; retrieving, in dependence upon the global history vector pointer, from a rolling global history vector buffer, a second portion of the global history vector; and performing a second branch prediction in dependence upon a combination of the first portion and second portion of the global history vector.

20 Claims, 6 Drawing Sheets

(56) References Cited

OTHER PUBLICATIONS

IBM, "Method to Exclude Bad Patterns from a Pattern History Table Branch Predictor", An IP.com Prior Art Database Tech Disclosure (online), IP.com No. 000191968, dated Jan. 19, 2010, 5 pages.
Disclosed Anonymously, "System and Method for Recovering Global Branch Prediction Information Using Address Offset Information", An IP.com Prior Art Database Technical Disclosure (online), IP.com No. 000216961, printed Nov. 17, 2015, 5 pages.

* cited by examiner

BRANCH PREDICTION IN A COMPUTER PROCESSOR

BACKGROUND

Field of the Invention

The field of the present disclosure is data processing, or, more specifically, methods, apparatus, and computer processors configured for branch prediction.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors. Branch prediction is one form of increasing speed of operation in computer processors.

SUMMARY

Methods, apparatus, and processors configured for branch prediction are described in this specification. Such branch prediction includes: fetching an instruction, the instruction comprising an address, the address comprising a first portion of a global history vector and a global history vector pointer; performing a first branch prediction in dependence upon the first portion of the global history vector; retrieving, in dependence upon the global history vector pointer, from a rolling global history vector buffer, a second portion of the global history vector; and performing a second branch prediction in dependence upon a combination of the first portion and second portion of the global history vector.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
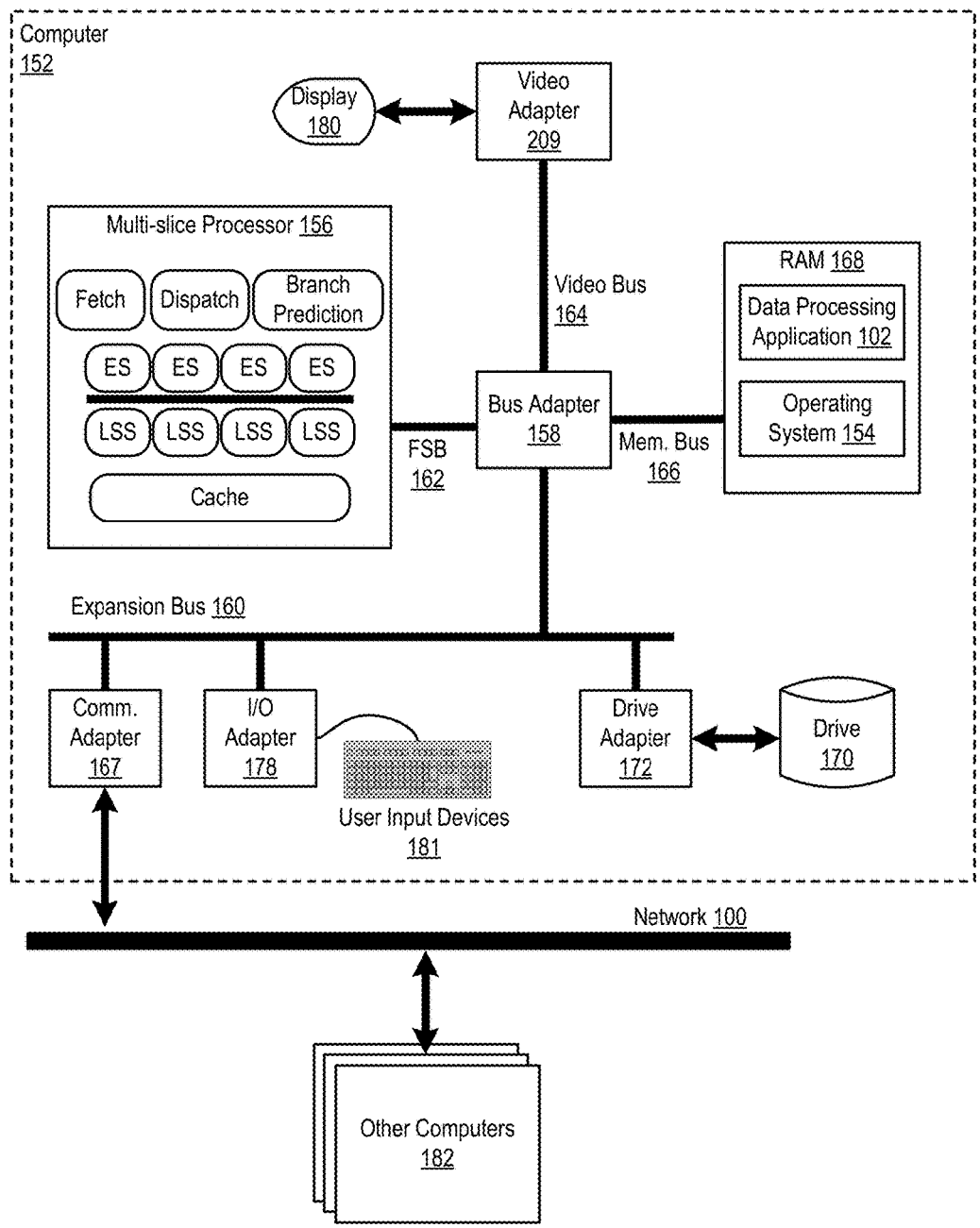
FIG. 1 sets forth a block diagram of an example system configured for branch prediction in a computer processor according to embodiments of the present invention.

Exemplary methods and apparatus for branch prediction in a computer processor in accordance with the present invention are described with reference to the accompanying drawings, beginning with FIG. 1. FIG. 1 sets forth a block diagram of an example system configured for branch prediction in a computer processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
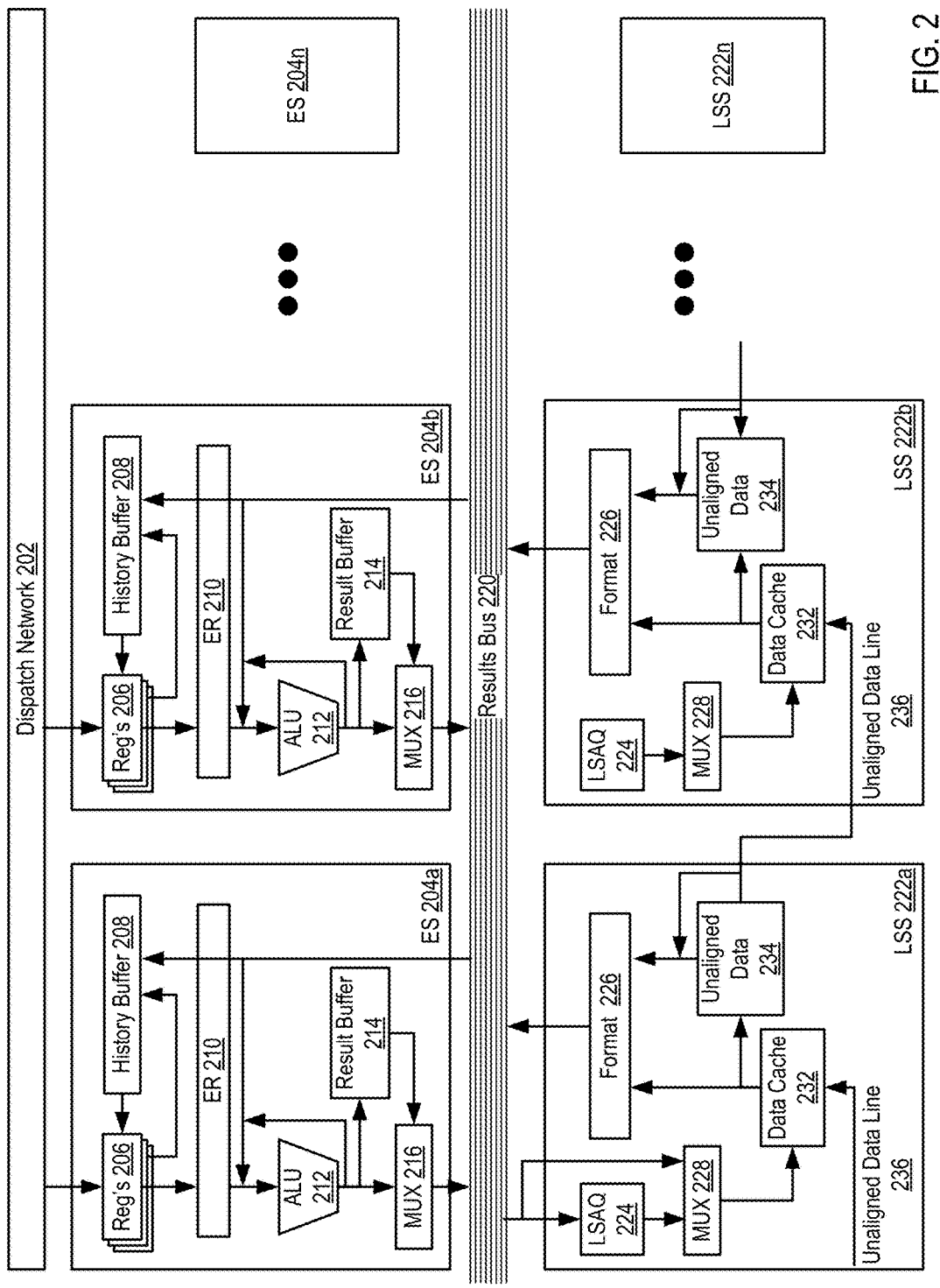
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of an architectural register that enables out-of-order execution of instructions that target the same architectural register.

When a younger instruction targeting the same particular logical register is received, the entry in the general purpose register is moved to the history buffer. The history buffer (208) may be configured to store many identifiers of instructions targeting the same logical register. That is, the general purpose register is generally configured to store a single, youngest instruction identifier for each logical register while the history buffer may store many identifiers of non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a, 222b, 222c) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
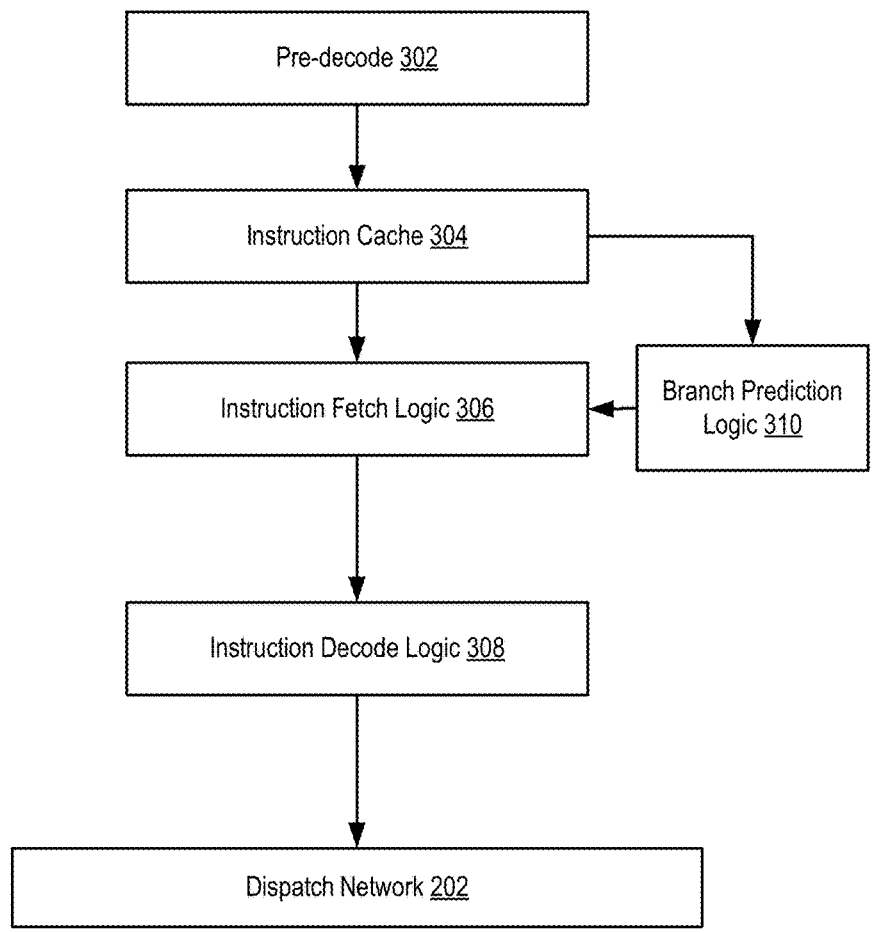
FIG. 3 sets forth a block diagram of another portion of a multi-slice processor according to embodiments of the present invention.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308).

The example instruction decode logic (308) of FIG. 3 performs a final decode operation on the fetched instructions and provides the decoded instructions to the dispatch network (202). The dispatch network as described above, dispatches the decoded instructions among slices.

Figure 4:
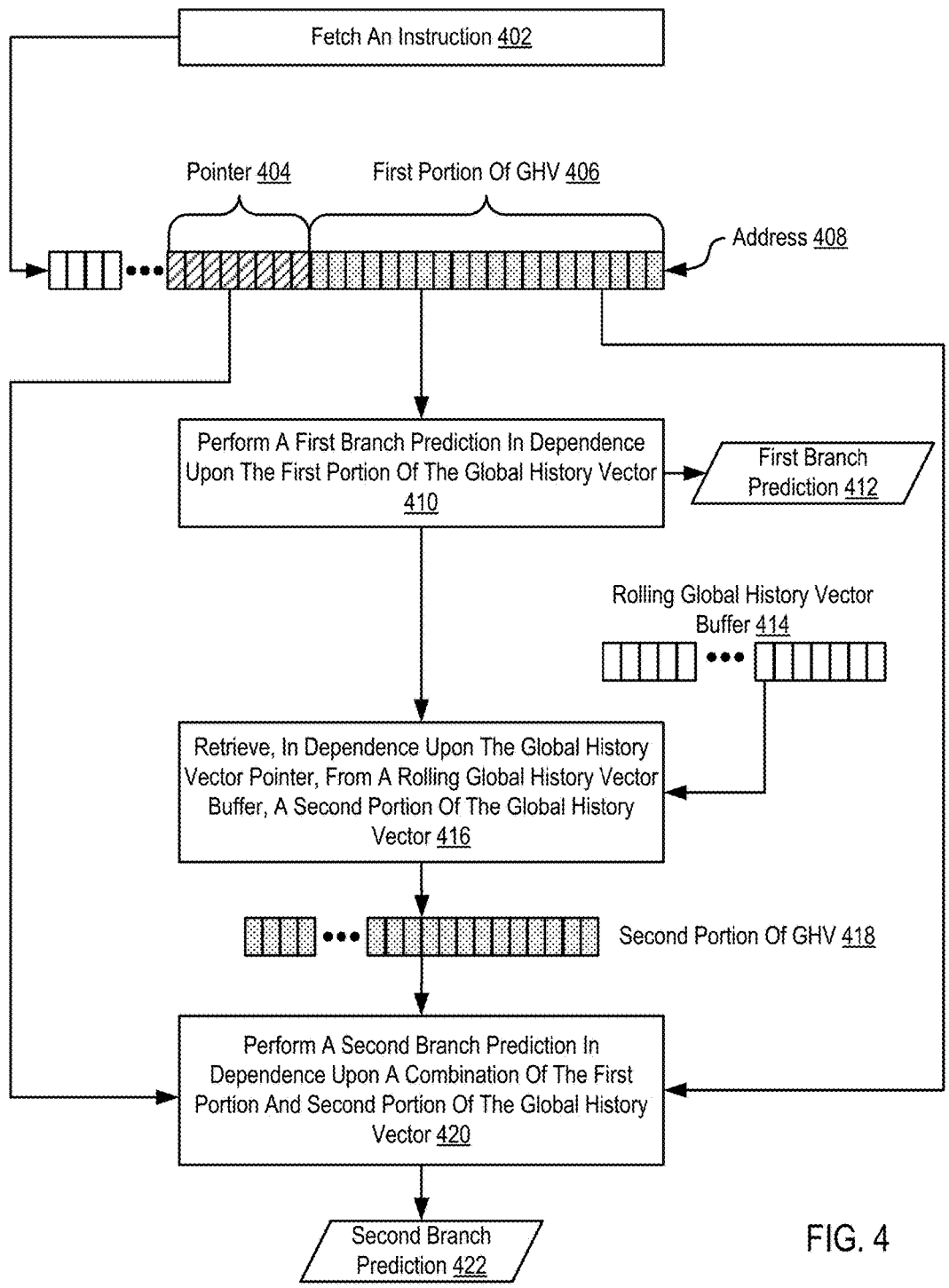
FIG. 4 sets forth a flow chart illustrating an exemplary method for branch prediction in a computer processor.

For further explanation, FIG. 4 sets forth a flow chart illustrating an exemplary method for branch prediction in a computer processor, such as the multi-slice processor in the example of FIG. 2 and FIG. 3. The method of FIG. 4 includes fetching (402) an instruction. Fetching (402) an instruction may be carried out by an instruction fetch unit and may include fetching along with an op code for the instruction an address (408). The address in the example of FIG. 4 includes a first portion (406) of a global history vector and a global history vector pointer (404).

A global history vector as the term is used in this specification refers to a bit vector that includes historical branch prediction statistics. In some embodiments, the address of the fetched instruction includes 20 bits of a 100 bit global history vector. The 20 bits may contain the most recent historical branch prediction statistics. The remaining 80 bits of the global history vector may be stored in a global history vector buffer (414) that is described below in greater detail. The remaining 80 bits may contain historical branch prediction statistics generated prior to the 20 bits included in the address.

The 20 bits, "the first portion of the global history vector," may be utilized by branch prediction logic to make a local, quick, or basic prediction. Such a prediction may be generally less accurate than forming a branch prediction based on the entire 100 bits, but may be utilized to form a branch prediction more quickly than utilizing the full 100 bits of the global history vector. To that end, the method of FIG. 4 continues by performing (410) a first branch prediction (412) in dependence upon the first portion of the global history vector. Branch prediction logic may utilize the 20 bits of the branch history vector to 'guess' whether a branch will be taken, the address of a taken branch, and so on.

The method of FIG. 4 also includes retrieving (416), in dependence upon the global history vector pointer (404), from a rolling global history vector buffer (414), a second portion (418) of the global history vector. The second portion (418) of the global history vector is greater in bit length than the first portion. A rolling global history vector buffer is a buffer of branch history statistics large enough to contain a global history vector for a given instruction. In embodiments in which a global history vector for an instruction is 100 bits, the rolling global history vector buffer may include 256 bits of branch prediction statistics. Further, the buffer (414) is 'rolling' in that once all 256 entries are filled, the branch prediction logic begins 'rolls-over' and begins filling the first entry of the buffer.

The global history vector pointer (404) is a pointer into the rolling global history vector buffer (414). In some embodiments, the pointer points to the next entry in the buffer (414) to be filled. To that end, retrieving (416) a second portion (418) of the global history vector may be carried out by utilizing a number of multiplexers to retrieve ("mux out") from the buffer the remaining 80 bits of the instructions' global history vector—"the second portion of the global history vector." The pointer may be utilized as select inputs to the multiplexer. In embodiments in which the rolling global history vector buffer is 256 bits in length, the pointer may be an 8 bit pointer. Readers of skill in the art will recognize that, because the pointer points to the next entry to be filled and the instruction already includes the first portion of the global history vector, the branch prediction logic need not retrieve that first portion of the global history vector, but rather only the second portion. Consider, for example, that the global history vector pointer points to entry 201 in the buffer. In embodiments in which the first portion of the global history vector included in the address is 20 bits and the remainder is the previous 80 bits of the rolling global history vector, the branch prediction logic need retrieve the bits in entries 101-180.

The method of FIG. 4 also includes performing (420) a second branch prediction (422) in dependence upon a combination of the first portion (406) and second portion (418) of the global history vector. That is, once the entire global history vector is retrieved including, both the first and second portion, the branch prediction logic may make a possibly more accurate or "global" prediction.

Figure 5:
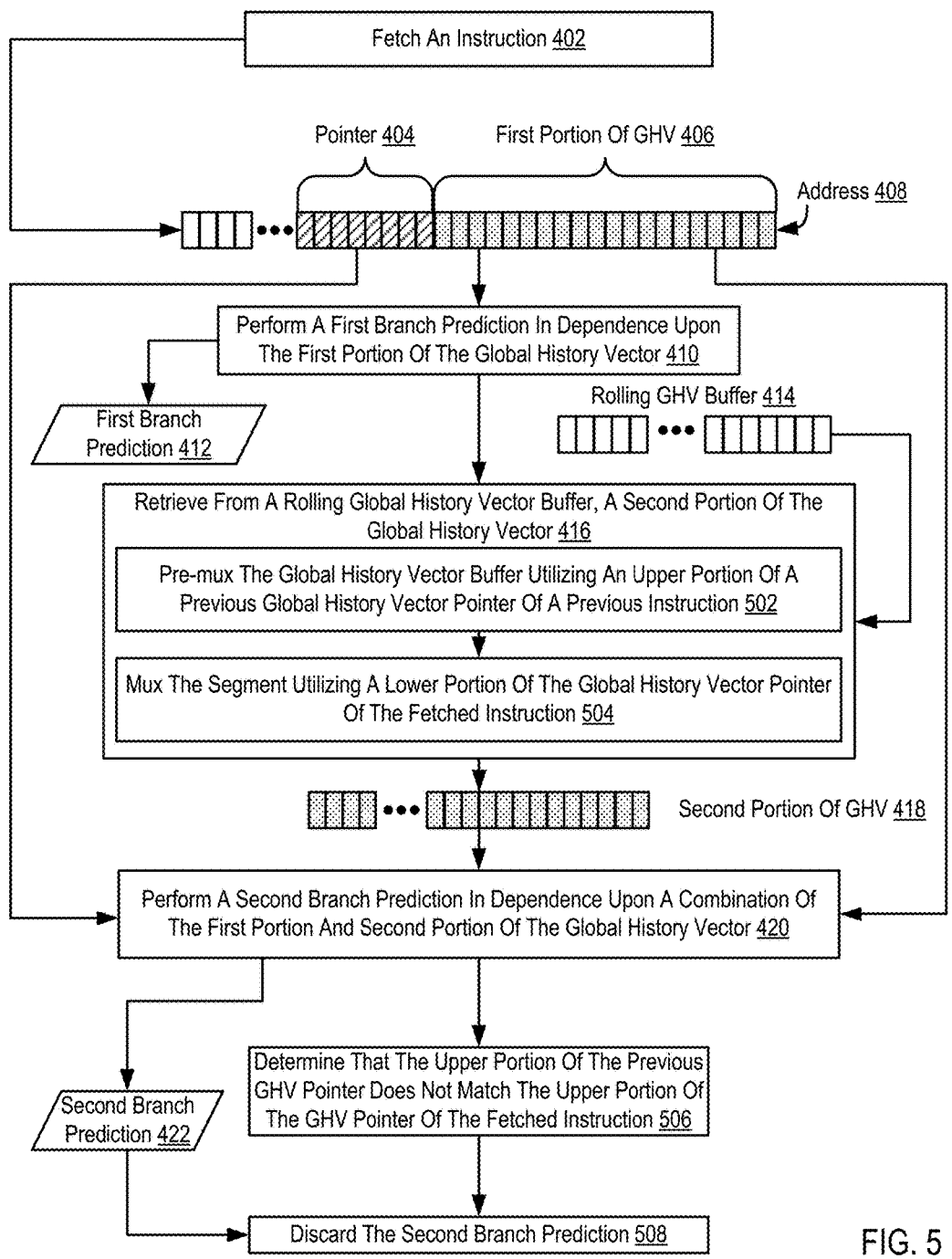
FIG. 5 sets forth a flow chart illustrating a further exemplary method for branch prediction in a computer processor.

For further explanation, FIG. 5 sets forth a flow chart illustrating a further exemplary method for branch prediction in a computer processor, such as the multi-slice processor in the example of FIG. 2 and FIG. 3. The method of FIG. 5 is similar to the method of FIG. 4 in that the method of FIG. 5 also includes: fetching (402) an instruction, the instruction including an address (408), the address including a first portion (404) of a global history vector and a global history vector pointer (406); performing (410) a first branch prediction (412) in dependence upon the first portion (406) of the global history vector; retrieving (416), in dependence upon the global history vector pointer (404), from a rolling global history vector buffer (414), a second portion (418) of the global history vector; and performing (420) a second branch prediction (422) in dependence upon a combination of the first portion and second portion of the global history vector.

The method of FIG. 5 differs from the method of FIG. 4, however, in that in the method of FIG. 5, retrieving (416) the second portion (418) of the global history vector is carried out by pre-muxing (502) the rolling global history vector buffer utilizing an upper portion of a previous global history vector pointer of a previous instruction, thereby producing a segment. The term 'upper portion' here refers to higher order bits of a vector pointer while the term 'lower portion' refers to bits that are lower order than the upper portion. The term 'pre-muxing' as used her refers to performing a multiplexer operation in one instruction fetch cycle prior to performing a second multiplexer operation in a second instruction fetch cycle with select inputs from a portion of a prior instruction's global history vector pointer. Consider, for example, that the current instruction, $I_1$, has an 8-bit global history vector pointer that points to an entry of a 256 bit rolling global history vector buffer. In some embodiments, the pointer may move infrequently enough that the highest order bits, say the highest 2 bits of the 8-bit pointer, change very infrequently. To that end, the branch prediction logic may effectively utilize some higher order bits from a previous instruction's ($I_0$) pointer to being a first multiplexer operation on the rolling global history vector as the likelihood that these higher order bits match the higher order bits of the current instruction's ($I_1$) pointer. Said another way, before the pointer value of $I_1$ is available to perform a multiplexer operation on the rolling global history vector to retrieve the second portion of $I_1$'s global history vector, the branch prediction logic may perform the multiplexer operation using some higher order bits from a previous instruction's pointer. The output of such a pre-muxing operation is referred to here as segment.

The method of FIG. 5 also includes muxing (504) the segment produced by the pre-muxing by utilizing a lower portion of the global history vector pointer of the fetched instruction. Muxing (504) the segment utilizing a lower portion of the global history vector pointer of the fetched instruction may be carried out with a number of multiplexers, each of which utilize a different number of bits of the lower portion of the fetched instruction's pointer.

The method of FIG. 5 also includes determining (506) whether the upper portion of the previous global history vector pointer does not match the upper portion of the global history vector pointer of the fetched instruction. If the upper portion of the previous global history vector pointer does match the upper portion of the global history vector pointer of the fetched instruction, the second branch prediction may be utilized. If, however, as in FIG. 5, the two upper portions do not match, the method of FIG. 5 continues by discarding (508) the second branch prediction. If the two upper portions do not match, then the segment of bits pre-muxed out of rolling global history vector are not the segment of bits that would have otherwise been multiplexed out of the rolling global history vector if the fetched instruction's pointer were used in its entirety to perform the multiplexing. As such, the final output of the multiplexing operations will be incorrect as to the current instruction's pointer.

In some embodiments, the processor may include a plurality of threads. In such an embodiment, each thread may be assigned a rolling global history vector buffer. In such an embodiment, retrieving (416) the second portion of the global history vector may include retrieving the second portion of the global history vector from the rolling global history vector buffer assigned to the thread for the instruction. To that end, the branch prediction logic may also pre-mux a thread identifier for the rolling global history vector buffer assigned to thread for the fetched instruction.

Figure 6:
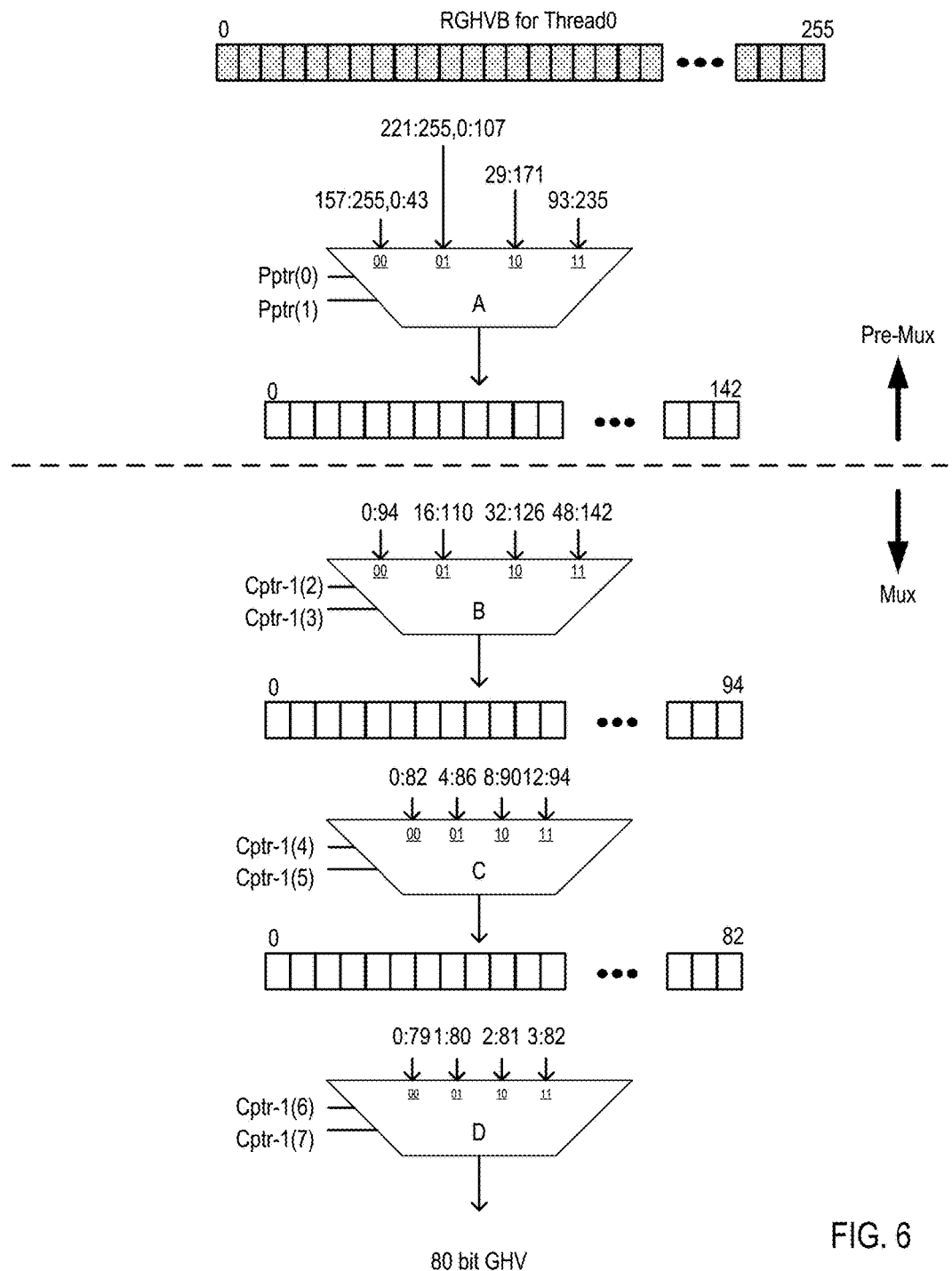
FIG. 6 sets forth a system of multiplexers configured to retrieve a portion of a global history vector for an instruction.

For further explanation, FIG. 6 sets forth a system of multiplexers configured to retrieve a portion of a global history vector for an instruction. The example system of FIG. 6 includes a rolling global history vector buffer (RGHVB) for a particular thread, thread 0. The example rolling global history vector buffer is a 256 bit buffer. In the example of FIG. 6, a global history vector pointer for an instruction is an 8 bit vector, each instruction includes address that, in turn, includes the most recent 20 bits of a global history vector, and 80 additional bits of the global history vector are stored in the RGHVB. To retrieve those additional 80 bits, the multiplexers of FIG. 6 may be utilized.

Segments of the RGHVB are provided as inputs to a first multiplexer (A). The branch prediction logic may pre-mux the RGHVB utilizing as select inputs, the highest order 2 bits of an 8 bit pointer from a previous instruction. These two bits are referred to as Pptr(0) and Pptr(1). The output of the first multiplexer (A) is a 143 bit segment.

The 143 bits of the segment output from the first multiplexer (A) are inputs to a second multiplexer (B). The second multiplexer (B) utilizes as select inputs the third and fourth bits of the 8-bit pointer of the currently fetched instruction minus 1. The current pointer, in some embodiments such as that in FIG. 6, points to the next entry to be filled. As such, subtracting 1 from the current pointer, provides the last entry to that was filled. To that end, the inputs to multiplexers are bits from the current pointer minus one. For the second multiplexer (B), these bits are referred to as Cptr-1(2) and Cptr-1(3), respectively. The second multiplexer (B) outputs a 95 bit segment.

The 95 bits of the segment output by the second multiplexer (B) are inputs to a third multiplexer (C). The third multiplexer (C) utilizes as select inputs the fifth and sixth bits of the 8-bit pointer of the currently fetched instruction minus 1. These bits are referred to as Cptr-1(4) and Cptr-1(5), respectively. The third multiplexer (C) outputs a 83 bit segment.

The 83 bits of the segment output by the third multiplexer (C) are inputs to a fourth multiplexer (D). The fourth multiplexer (D) utilizes as select inputs the seventh and eighth bits of the 8-bit pointer of the currently fetched instruction minus 1. These bits are referred to as Cptr-1(6) and Cptr-1(7), respectively. The fourth multiplexer (D) outputs an 80 bit segment. This 80 bit segment may be combined with the 20 bits of global history vector provided in the current instruction's address to form the complete global history vector for that instruction.

Consider the following example in which the current pointer is 201. The current pointer minus 1 is 200 (11001000). As such, the branch prediction logic will utilize the current instruction's pointer, the previous instruction's pointer, and the multiplexers (A-D) of FIG. 6 to multiplex from the 256-bit RGBHV, bits 101-180.

The upper two bits of the previous instruction's pointer are 11. The first multiplexer (A), utilizing Pptr(0) and Pptr(1) as select inputs, will select as an output, bits 93:235 of the RGBHV.

Cptr-1(2) and Cptr-1(3) are 00. Utilizing 00 as the select inputs, the second multiplexer (B) will select as an output, bits 0:94 from RGBHV bits 93:235 provided by the first multiplexer (A). The result is a 95 bit vector that includes the RGBHV bits 93-187.

Cptr-1(4) and Cptr-1(5) are 10. Utilizing 10 as the select inputs, the third multiplexer (C) will select as an output, bits 8:90 from RGBHV bits 93-187 provided by the second multiplexer (B). The result is an 83 bit vector that includes RGBHV bits 101-183.

Cptr-1(6) and Cptr-1(7) are 00. Utilizing 00 as the select inputs, the fourth multiplexer (D) will select as an output, bits 0:79 from RGBHV bits 101-183 provided by the third multiplexer (C). The result is an 80 bit vector that includes RGBHV bits 101-180. Combining these 80 bits with the 20 bits provided in the address of the currently fetched instruction provides a 100 bit global history vector.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of branch prediction in a computer processor, the method comprising:
   fetching an instruction, including fetching an op code for the instruction and an address, the address comprising a first portion of a global history vector and a global history vector pointer into a rolling global history vector buffer, the first portion of the global history vector comprising first historical branch prediction statistics, wherein the global history vector pointer points to, and is used in filling, a next entry in the rolling global history vector buffer;
   performing a first branch prediction in dependence upon the first portion of the global history vector;
   retrieving, in dependence upon the global history vector pointer, from the rolling global history vector buffer, a second portion of the global history vector, the second portion of the global history vector comprising second historical branch prediction statistics generated prior to the first historical branch prediction statistics; and
   performing a second branch prediction in dependence upon a combination of the first portion and second portion of the global history vector.

2. The method of claim 1 further comprising:
   wherein the first portion of the global history vector is shorter in bit length than the second portion of the global history vector.

3. The method of claim 1 wherein retrieving the second portion of the global history vector comprises:
   pre-muxing the rolling global history vector buffer utilizing an upper portion of a previous global history vector pointer of a previous instruction, thereby producing a segment; and
   muxing the segment utilizing a lower portion of the global history vector pointer of the fetched instruction.

4. The method of claim 3 further comprising determining that the upper portion of the previous global history vector pointer does not match the upper portion of the global history vector pointer of the fetched instruction; and
   discarding the second branch prediction.

5. The method of claim 3 wherein:
   the rolling global history vector buffer comprises 256 bits;
   each global history vector pointer comprises 8 bits;
   the upper portion of the previous global history vector pointer comprise the upper 2 bits of the previously global history vector pointer; and
   the lower portion of the global history vector pointer of the fetch instruction comprises the lower 6 bits.

6. The method of claim 1 wherein the processor includes a plurality of threads and each thread is assigned a rolling global history vector buffer; and retrieving a second portion of the global history vector further comprises retrieving the second portion of the global history vector from the rolling global history vector buffer assigned to a thread for the fetched instruction.

7. The method of claim 1 wherein retrieving the second portion of the global history vector from the rolling global history vector buffer assigned to a thread for the fetched instruction further comprises pre-muxing a thread identifier for the rolling global history vector buffer assigned to the thread for the fetched instruction.

8. A computer system comprising a computer processor, the computer processor configured to carry out:
   fetching an instruction, including fetching an op code for the instruction and an address, the address comprising a first portion of a global history vector and a global history vector pointer into a rolling global history vector buffer, the first portion of the global history vector comprising first historical branch prediction statistics, wherein the global history vector pointer points to, and is used in filling, a next entry in the rolling global history vector buffer;
   performing a first branch prediction in dependence upon the first portion of the global history vector;
   retrieving, in dependence upon the global history vector pointer, from the rolling global history vector buffer, a second portion of the global history vector, the second portion of the global history vector comprising second historical branch prediction statistics generated prior to the first historical branch prediction statistics; and
   performing a second branch prediction in dependence upon a combination of the first portion and second portion of the global history vector.

9. The apparatus of claim 8 further comprising:
   wherein the first portion of the global history vector is shorter in bit length than the second portion of the global history vector.

10. The apparatus of claim 8 wherein retrieving the second portion of the global history vector comprises:
    pre-muxing the rolling global history vector buffer utilizing an upper portion of a previous global history vector pointer of a previous instruction, thereby producing a segment; and
    muxing the segment utilizing a lower portion of the global history vector pointer of the fetched instruction.

11. The apparatus of claim 10 further comprising determining that the upper portion of the previous global history vector pointer does not match the upper portion of the global history vector pointer of the fetched instruction; and
    discarding the second branch prediction.

12. The apparatus of claim 10 wherein:
    the rolling global history vector buffer comprises 256 bits;
    each global history vector pointer comprises 8 bits;
    the upper portion of the previous global history vector pointer comprise the upper 2 bits of the previously global history vector pointer; and
    the lower portion of the global history vector pointer of the fetch instruction comprises the lower 6 bits.

13. The apparatus of claim 8 wherein the processor includes a plurality of threads and each thread is assigned a rolling global history vector buffer; and retrieving a second portion of the global history vector further comprises retrieving the second portion of the global history vector from the rolling global history vector buffer assigned to a thread for the fetched instruction.

14. The apparatus of claim 8 wherein retrieving the second portion of the global history vector from the rolling global history vector buffer assigned to a thread for the fetched instruction further comprises pre-muxing a thread identifier for the rolling global history vector buffer assigned to the thread for the fetched instruction.

15. A computer processor configured for branch prediction, the computer processor configured to carry out:
fetching an instruction, including fetching an op code for the instruction and an address, the address comprising a first portion of a global history vector and a global history vector pointer into a rolling global history vector buffer, the first portion of the global history vector comprising first historical branch prediction statistics, wherein the global history vector pointer points to, and is used in filling, a next entry in the rolling global history vector buffer;
performing a first branch prediction in dependence upon the first portion of the global history vector;
retrieving, in dependence upon the global history vector pointer, from the rolling global history vector buffer, a second portion of the global history vector, the second portion of the global history vector comprising second historical branch prediction statistics generated prior to the first historical branch prediction statistics; and
performing a second branch prediction in dependence upon a combination of the first portion and second portion of the global history vector.

16. The computer processor of claim 15 further comprising:
wherein the first portion of the global history vector is shorter in bit length than the second portion of the global history vector.

17. The computer processor of claim 15 wherein retrieving the second portion of the global history vector comprises:
pre-muxing the rolling global history vector buffer utilizing an upper portion of a previous global history vector pointer of a previous instruction, thereby producing a segment; and
muxing the segment utilizing a lower portion of the global history vector pointer of the fetched instruction.

18. The computer processor of claim 17 further comprising determining that the upper portion of the previous global history vector pointer does not match the upper portion of the global history vector pointer of the fetched instruction; and
discarding the second branch prediction.

19. The computer processor of claim 15 wherein the processor includes a plurality of threads and each thread is assigned a rolling global history vector buffer; and retrieving a second portion of the global history vector further comprises retrieving the second portion of the global history vector from the rolling global history vector buffer assigned to a thread for the fetched instruction.

20. The computer processor of claim 15 wherein retrieving the second portion of the global history vector from the rolling global history vector buffer assigned to a thread for the fetched instruction further comprises pre-muxing a thread identifier for the rolling global history vector buffer assigned to the thread for the fetched instruction.

* * * * *